United States Patent
Oono (10) Patent No.: US 10,201,923 B2
(45) Date of Patent: Feb. 12, 2019

(54) INJECTION MOLDING MACHINE INCLUDING MOLD ROTATING DEVICE

(71) Applicant: FANUC Corporation, Yamanashi (JP)

(72) Inventor: Hajime Oono, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 155 days.

(21) Appl. No.: 15/227,168

(22) Filed: Aug. 3, 2016

(65) Prior Publication Data
US 2017/0036384 A1 Feb. 9, 2017

(30) Foreign Application Priority Data
Aug. 4, 2015 (JP) ................................. 2015-153983

(51) Int. Cl.
| | |
|---|---|
| B29C 45/80 | (2006.01) |
| B29C 45/04 | (2006.01) |
| B29C 45/26 | (2006.01) |
| B29C 45/76 | (2006.01) |
| B29C 45/06 | (2006.01) |

(52) U.S. Cl.
CPC ............. B29C 45/80 (2013.01); B29C 45/76 (2013.01); B29C 45/0441 (2013.01); B29C 45/06 (2013.01); B29C 45/2681 (2013.01); B29C 2945/76096 (2013.01); B29C 2945/76578 (2013.01)

(58) Field of Classification Search
CPC ......... B29C 45/80; B29C 45/76; B29C 45/06; B29C 2945/76096; B29C 45/0441; B29C 45/2681; B29C 2945/76
USPC ..................... 264/297.2, 328.11, 328.8, 40.1
See application file for complete search history.

(56) References Cited

U.S. PATENT DOCUMENTS

2016/0077498 A1* 3/2016 Matsubayashi .......... G05B 1/08
    318/490

FOREIGN PATENT DOCUMENTS

| EP | 2388122 A2 | 11/2011 |
|---|---|---|
| JP | H01132344 U | 9/1989 |
| JP | 3-224013 A | 10/1991 |
| JP | 2000296532 A | 10/2000 |
| JP | 2005-271468 A | 10/2005 |
| JP | 2007-283701 A | 11/2007 |
| JP | 2011-240598 A | 12/2011 |
| JP | 2014121717 A | 7/2014 |

OTHER PUBLICATIONS

English Translation JP403224013.*
English Translation JP1132344.*
Decision to Grant a Patent in JP Patent Application No. 2015-153983, dated Oct. 24, 2017, 6 pp.

* cited by examiner

Primary Examiner — Joseph S Del Sole
Assistant Examiner — Mohamed K Ahmed Ali
(74) Attorney, Agent, or Firm — Hauptman Ham, LLP (57) ABSTRACT

A first rotation controller that rotates a rotary table by feedback control based on a rotation amount detected by a rotation amount detection unit and a second rotation controller that rotates the rotary table by the feedback control based on a distance detected by a distance detection unit are included and rotation control by the first rotation controller is switched to that by the second rotation controller at a predetermined rotation angle.

3 Claims, 12 Drawing Sheets

HEIGHT OF DETECTED PORTION 1: 1.00 mm
PARAMETER: 0.00

DISPLACEMENT DETECTED BY SENSOR: 1.00

DETECTED POSITION (AFTER ADJUSTMENTS):
1.00 + 0.00 = 1.00

FIG. 8B

HEIGHT OF DETECTED PORTION 2: 0.99 mm
PARAMETER: -0.01

DISPLACEMENT DETECTED BY SENSOR: 1.01

DETECTED POSITION (AFTER ADJUSTMENTS):
1.01 − 0.01 = 1.00

FIG. 8C

HEIGHT OF DETECTED PORTION 3: 1.02 mm
PARAMETER: 0.02
DISPLACEMENT DETECTED BY SENSOR: 0.98
DETECTED POSITION (AFTER ADJUSTMENTS):
0.98 + 0.02 = 1.00

FIG. 9A

DISTANCE BETWEEN SENSOR 1 AND DETECTED
PORTION: 1.00 mm
PARAMETER: 0.00
DISPLACEMENT DETECTED BY SENSOR 1: 1.00
DETECTED POSITION (AFTER ADJUSTMENTS):
1.00 + 0.00 = 1.00

FIG. 9B

DISTANCE BETWEEN SENSOR 3 AND DETECTED
PORTION: 0.99 mm
PARAMETER: 0.01
DISPLACEMENT DETECTED BY SENSOR 3: 0.99
DETECTED POSITION (AFTER ADJUSTMENTS):
0.99 + 0.01 = 1.00

FIG. 9C

DISTANCE BETWEEN SENSOR 2 AND DETECTED
PORTION: 1.02 mm
PARAMETER: -0.02
DISPLACEMENT DETECTED BY SENSOR 2: 1.02
DETECTED POSITION (AFTER ADJUSTMENTS):
1.02 - 0.02 = 1.00

FIG. 10

INJECTION MOLDING MACHINE INCLUDING MOLD ROTATING DEVICE

RELATED APPLICATIONS

The present application claims priority to Japanese Patent Application Number 2015-153983, filed Aug. 4, 2015, the disclosure of which is hereby incorporated by reference herein in its entirety.

BACKGROUND OF THE INVENTION

1. Field of the Invention

The present invention relates to an injection molding machine, and in particular, relates to an injection molding machine including a mold rotating device.

2. Description of the Related Art

In general, an injection molding machine includes a mold and a molten resin is injected into the mold and then, mold clamping is performed for molding. When a mold closing or mold clamping is performed in the molding process, the mold closing or mold clamping is normally performed without the mold being rotated. However, when resins of a plurality of colors or a plurality of types are used for molding, it is necessary to rotate a movable side of the mold using a rotary table to inject resins of different colors or types.

When it is necessary to rotate the mold as described above, the stop of the mold after being rotated needs to be repeatedly positioned with precision to appropriately inject resins from any injection source. However, the influence of backlash increases with an increasing size of device and it may be difficult for an encoder provided in a drive motor to drive the mold alone to ensure the precision of positioning.

According to the technology disclosed for a micro film by Japanese Utility Model Registration Application No. 63-26620 (JP 1-132344 U), a rotational position of a rotary table is detected by a rotational position calculation device of the rotary table. Then, the rotary table is moved to a set rotation position by rotation in accordance with the resolution of a rotary encoder.

According to the technology disclosed by JP 2000-296532 A, the stop position is fine-tuned by a positioning unit in a mold rotating device provided with a positioning block in a lower portion of a table rotating device and a rotation portion is controlled to decelerate to a low-speed state from the rotation start and a high-speed state before being positioned in a final stop position where the positioning block and a stopper of the positioning unit are made to mechanically bump against each other.

According to the technology disclosed by JP 2014-121717 A, a servo motor that moves at least one of molds via a ram axis is included and a signal of an encoder of the servo motor or a signal of a linear sensor monitoring the position of the ram axis is used as control input to exercise feedback control of the position by the signal of the encoder in an interval in which the linear sensor cannot detect the position of the mold. The feedback control of position is exercised based on a signal of the linear sensor in an interval where the position of a mold can be detected by the linear sensor.

The technology disclosed for a micro film by Japanese Utility Model Registration Application No. 63-26620 (JP 1-132344 U) is a technology that gives feedback of positional information by mounting an encoder and an expensive device may be needed to mount the encoder. In addition, a measuring instrument needs to be incorporated into the device, which may make it difficult to retrofit the measuring instrument.

The technology disclosed by JP 2000-296532 A needs to mechanically adjust a positioning block to change the stop position, which may lead to difficulties of making correct adjustments in a short time.

The technology disclosed by JP 2014-121717 A uses control that uses a linear sensor and an encoder and thus can be applied only to linear movement of the mold.

SUMMARY OF THE INVENTION

An object of the present invention is to enable the control of positioning with high precision in the control of a rotational position of a mold in an injection molding machine without increasing costs.

An injection molding machine according to the present invention is an injection molding machine including: a motor having a rotation amount detection unit; and a mold rotating device driven by the motor and having a rotary table, wherein the mold rotating device includes: a detected portion provided in the rotary table; a distance detection unit that detects a distance to the detected portion; a first rotation controller that rotates the rotary table by feedback control based on a rotation amount detected by the rotation amount detection unit; a second rotation controller that rotates the rotary table by the feedback control based on the distance detected by the distance detection unit; and a rotation control switching unit that switches rotation control by the first rotation controller to the rotation control by the second rotation controller at a predetermined rotation angle between a rotation start and a rotation end of the rotary table.

Accordingly, after initially moving up to a target movement amount at high speed, correct positioning can be performed based on a signal of a displacement sensor of the distance detection unit. Therefore, a device of high production efficiency that performs positioning with high precision and is adjusted easily can be provided.

A reference correction unit that makes reference corrections of distance detection by the distance detection unit based on a positional relationship of a mold when the mold is closed may be included.

Accordingly, reference corrections of distance detection by the distance detection unit can be made when necessary so that displacements caused by a drift or the like can be corrected.

The mold rotating device performs positioning in at least two different phases of the rotary table, and includes an adjustment unit that adjusts the distance detected by the distance detection unit in each of the phases of the positioning.

Accordingly, when positioning is performed in at least two different phases, detection errors due to individual differences or mounting errors of respective displacement sensors or detected portions can be adjusted so that positioning can correctly be performed in different phases.

When the distance detected by the distance detection unit during switching from the rotation control by the first rotation controller to the rotation control by the second rotation controller deviates from a preset range, the mold rotating device may be determined to be abnormal.

Accordingly, by detecting whether the distance detected by the distance detection unit during switching from the rotation control by the first rotation controller to the rotation control by the second rotation controller deviates from a preset range, an abnormal state in which the mold does not rotate correctly even if the motor rotates a predetermined rotation amount can be determined.

According to the present invention, the control of positioning with high precision can be achieved in the control of a rotational position of a mold in an injection molding machine without increasing costs.

BRIEF DESCRIPTION OF THE DRAWINGS

The above object and other objects of the present invention will be apparent from the description below with reference to appended drawings. Among these drawings.

DETAILED DESCRIPTION OF THE PREFERRED EMBODIMENTS

Figure 1:
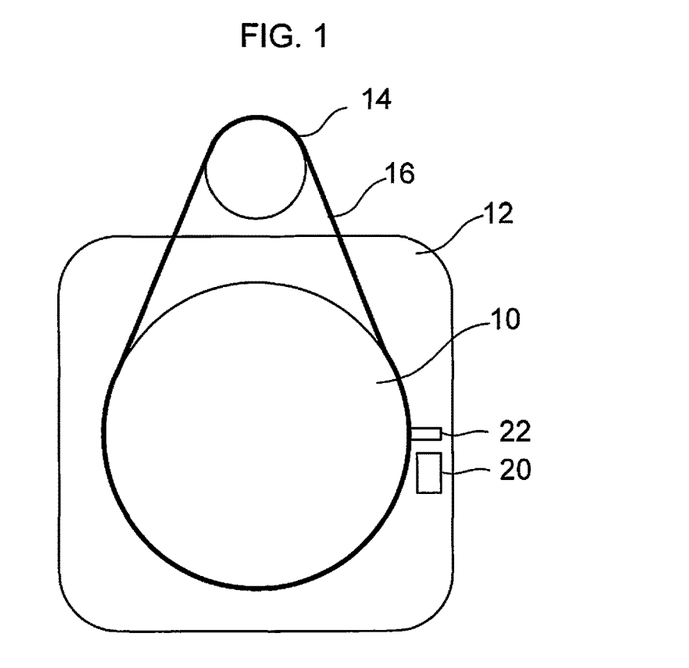
FIG. 1 is a diagram showing a relationship between a movable platen, a rotary table, a drive pulley and the like according to an embodiment of the present invention.

Hereinafter, the embodiments of the present invention will be described based on the drawings. FIG. 1 is a diagram showing a relationship between a movable platen, a rotary table, and a drive pulley according to the present embodiment. A rotatable rotary table 10 is provided on a movable platen 12 and a timing belt 16 is put between a drive pulley 14 as a drive source of the rotary table 10 and the rotary table 10 so that the rotary table 10 is rotated by the drive pulley 14 being driven. The drive pulley 14 is driven by a motor (not shown) and a rotational position is made detectable by a rotation detection device such as an encoder provided in the motor.

In addition, a displacement sensor 20 is provided in the movable platen 12 and a detected portion 22 is provided in the rotary table 10. The displacement sensor 20 and the detected portion 22 constitute a distance detection unit and a signal from the displacement sensor 20 is fed back to a control device of an injection molding machine. As the displacement sensor 20, a contact sensor may be used or a noncontact sensor using LED, laser, ultrasound or the like may be used. The detected portion 22 may be a member that can be attached to and detached from the rotary table 10 and can be detected by the displacement sensor 20 or may be formed by removing a portion of the rotary table 10.

The control device of the injection molding machine exercises the position control of the rotary table 10 such that a signal from the displacement sensor 20 becomes a set target value.

Figure 2:
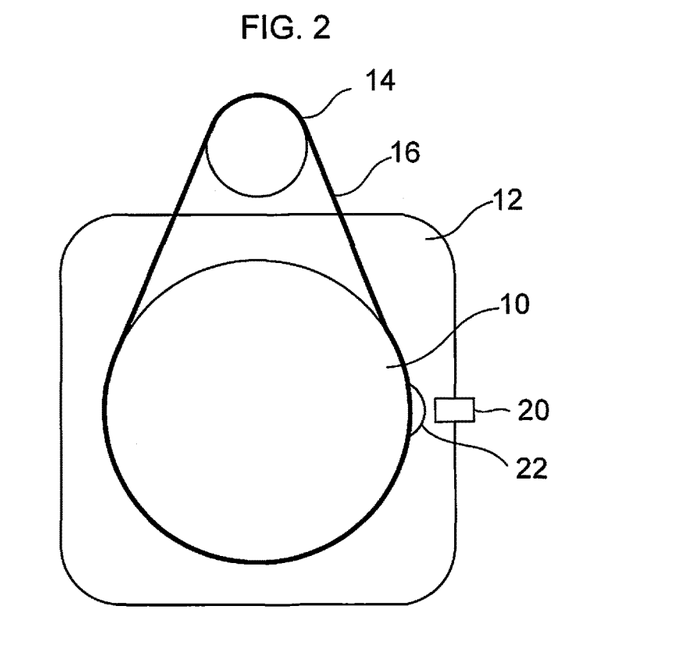
FIG. 2 is a diagram showing a modification of the relationship between the movable platen, the rotary table, the drive pulley and the like according to an embodiment of the present invention.
Figure 3:
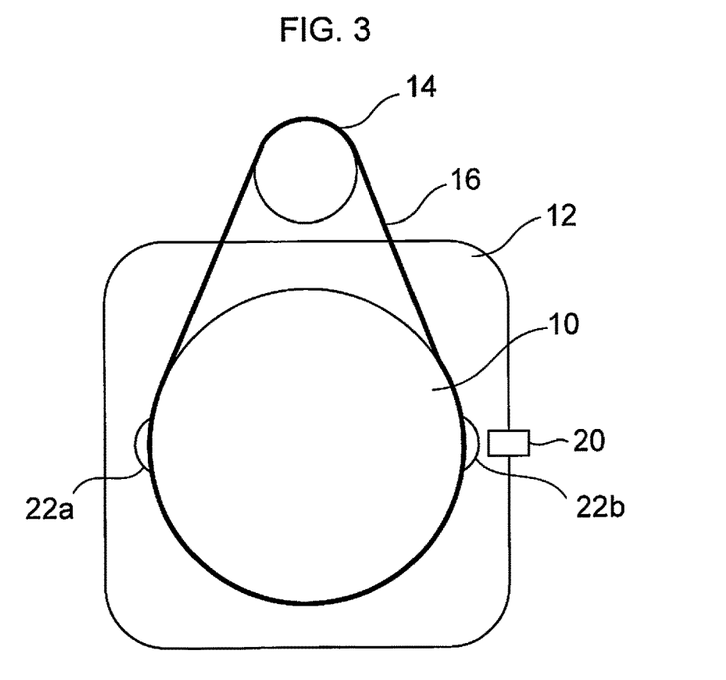
FIG. 3 is a diagram showing an example in which two detected portions are provided in the relationship between the movable platen, the rotary table, the drive pulley and the like according to an embodiment of the present invention.
Figure 4:
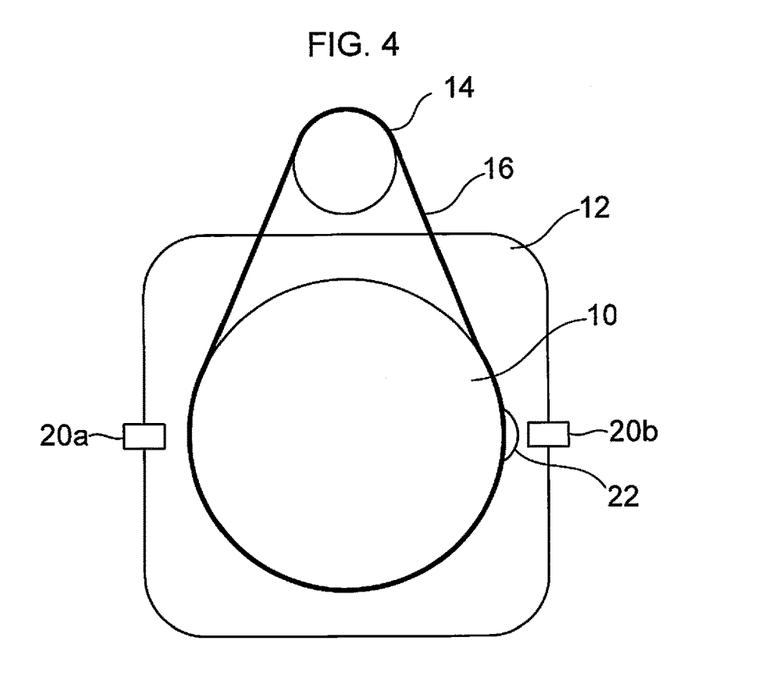
FIG. 4 is a diagram showing an example in which two displacement sensors are provided in the relationship between the movable platen, the rotary table, the drive pulley and the like according to an embodiment of the present invention.

The number and type of the displacement sensors 20 and the number and type of the detected portions 22 can appropriately be changed. FIG. 2 is an example in which the surface of the detected portion 22 in FIG. 1 is changed to a curved shape. FIG. 3 shows an example in which two detected portions 22 (22a, 22b) are provided diagonally in the rotary table 10 to implement position detection for each half rotation. Here, an example in which the two detected portions 22, each for every 180 degrees, are provided is described, but as described below, three detected portions 22 or more may be provided. FIG. 4 is a further modification of FIG. 3 and shows an example in which, instead of providing the two detected portions 22, two displacement sensors 20 are provided diagonally in the movable platen 12.

Figure 5:
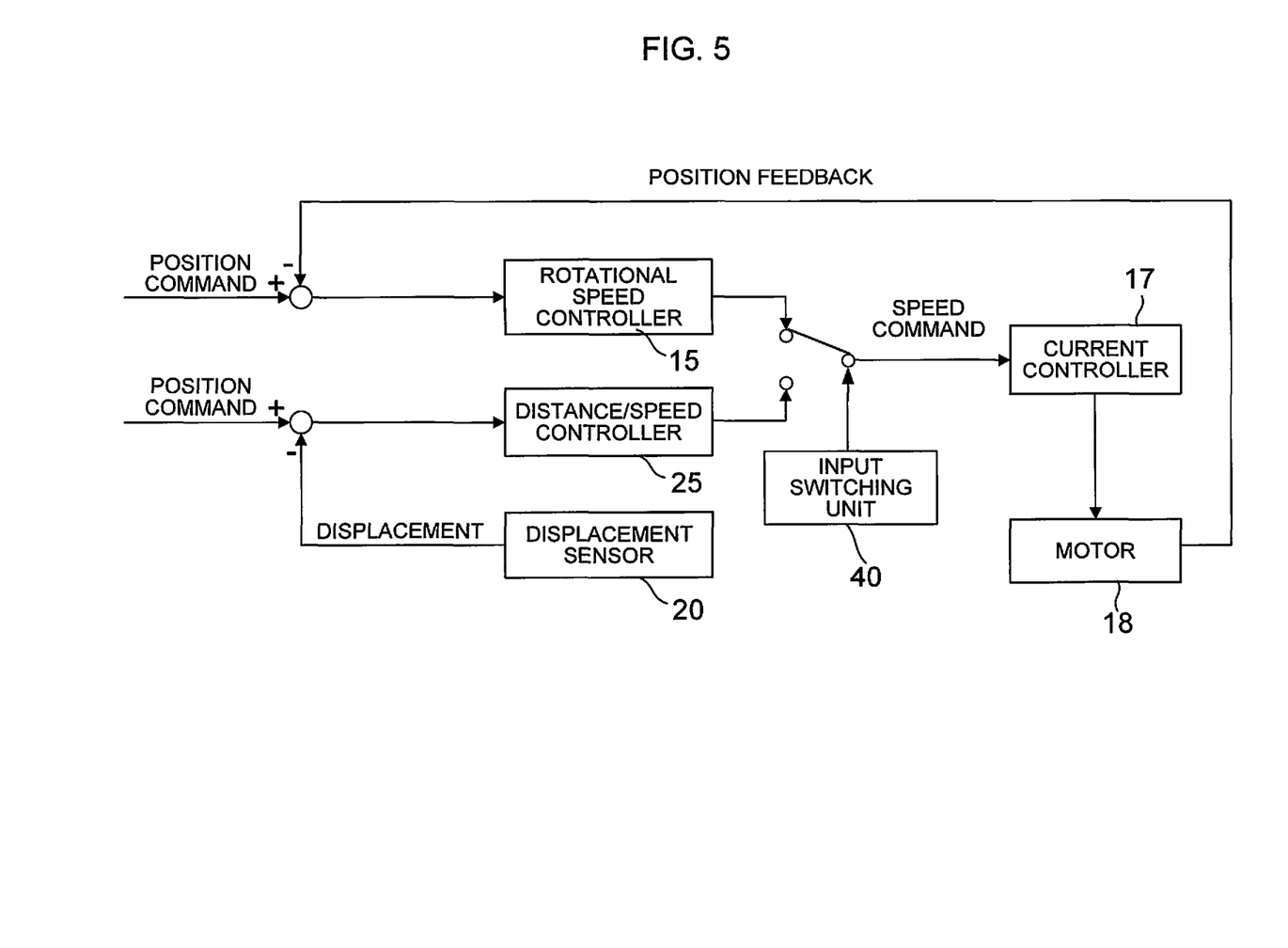
FIG. 5 is a block diagram showing the flow of a signal according to the present embodiment.

FIG. 5 is a block diagram showing the flow of a signal according to the present embodiment. A speed command from a rotational speed controller 15 of a motor is input into a current controller 17 and a motor 18 is driven by a signal from the current controller 17. Positional information of the motor 18 is returned and fed back to the rotational speed controller 15 together with a position command.

The position command and displacement information from the displacement sensor 20 are also input into a distance/speed controller 25. Then, the input of a speed command signal from the rotational speed controller 15 and a speed command signal from the distance/speed controller 25 is switched by switching of an input switching unit 40.

Figure 6:
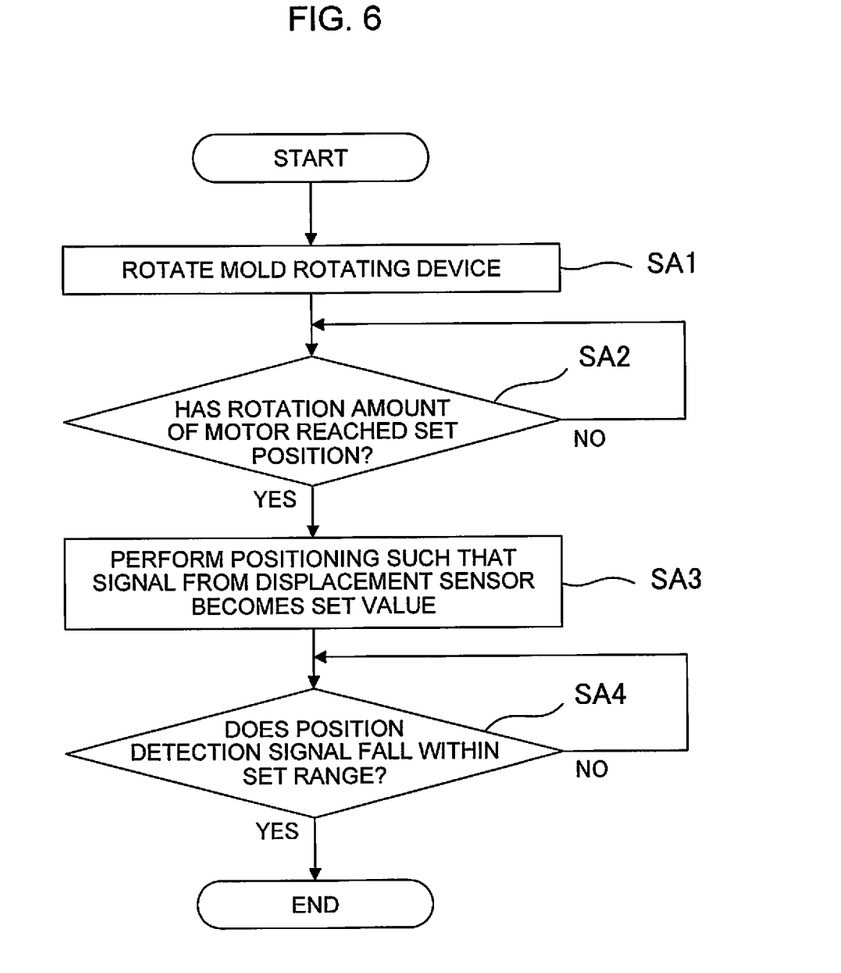
FIG. 6 is a flow chart showing the flow of an operation according to the present embodiment.

The operation in the present embodiment will be described based on the flow chart in FIG. 6.

(Step SA1) Rotate a mold rotating device by rotating a motor, a drive pulley, and a rotary table.

(Step SA2) Determine whether a rotation amount has reached a predetermined set position after rotating a preset number of rotations based on detection by a rotation detection device. If the set position is reached (YES), proceed to Step SA3 and if the set position is not reached (NO), repeat Step SA2.

(Step SA3) Transfer to control by a distance detection unit and position the mold rotating device such that a signal from a displacement sensor becomes a set value.

(Step SA4) Determine whether a position detection signal from the displacement sensor falls within a set range. If the position detection signal falls within the set range (YES), terminate the process and if the signal does not fall within the set range (NO), repeat Step SA4.

Accordingly, in the process of mold rotation, the mold rotating device first moves up to a target movement amount at high speed under the control of the rotation detection device. Then, the control transfers to the distance detection unit and a signal from the displacement sensor is used for positioning. Accordingly, the control of positioning with high precision can be achieved without increasing costs. In addition, the displacement sensor can relatively easily be mounted and easily configured.

When the injection molding machine is operated continuously for a long time, the displacement sensor 20 may drift due to factors such as a temperature rise caused by the operation, affecting precise positioning. The mold rotating device of the injection molding machine repeats positioning by periodically rotating to a set position. When the mold is closed, the mold is subject to a force in a direction so as to be in a correct position. Using the force, the reference value of the distance detection unit is corrected by a reference correction unit 42 based on the position of the mold when the mold is closed.

Figure 7:
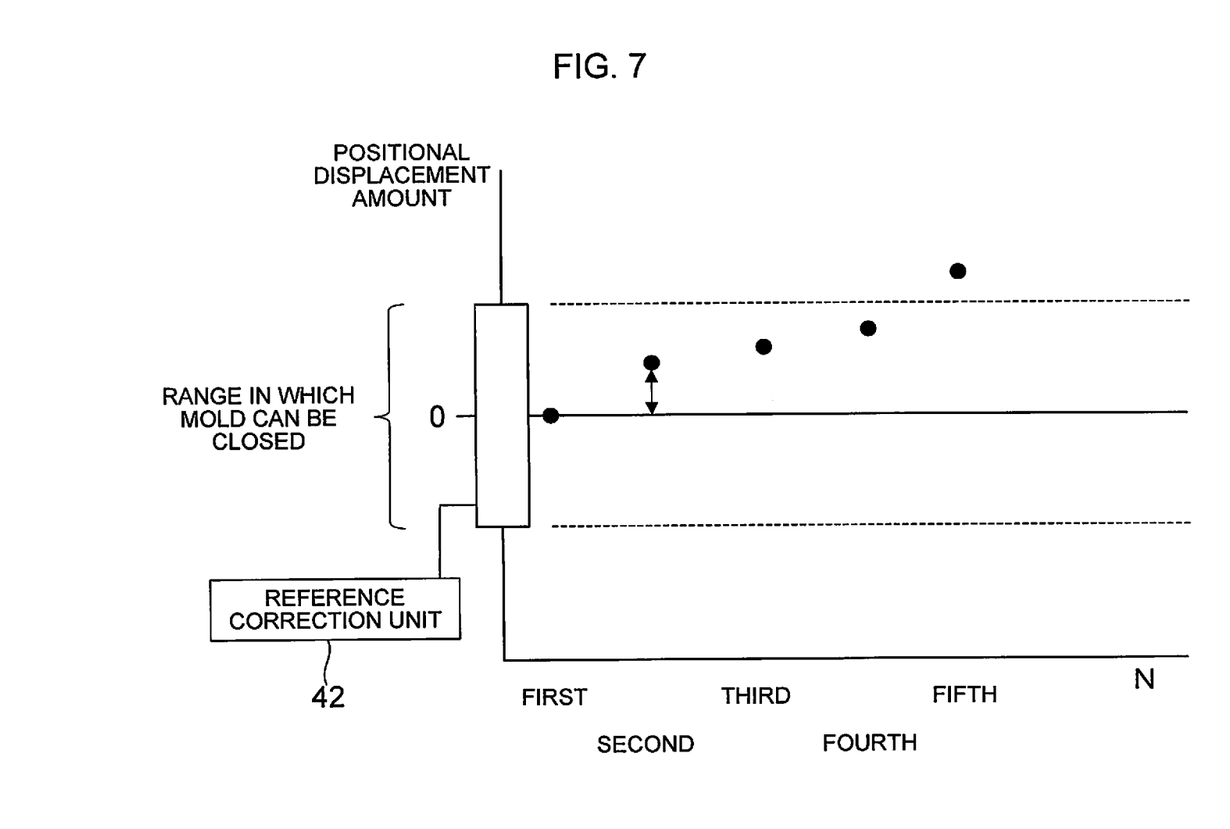
FIG. 7 is a diagram illustrating another embodiment of the present invention.

FIG. 7 is a diagram illustrating the present embodiment. The position of 0 in the center is the position without positional displacement and the vertical direction shows the amount of positional displacement. The range between vertical dotted lines shows a range in which, even if there is a positional displacement, the mold can be closed by mold clamping when closed and the mold is in an approximately correct position by the mold closing.

In the example shown in FIG. 7, there arises no positional displacement in the first mold closing, but there arise positional displacements in the second mold closing and thereafter. Shifts of the reference value by a drift of the displacement sensor 20 or the like can be considered as a cause of the positional displacement. When, for example, the mold is in an approximately correct position in the second mold closing, the reference value is corrected so that the reference value of the displacement sensor 20 has no positional displacement. Accordingly, the influence of drift can be decreased.

The reference value may be corrected each time a displacement arises, but may also be corrected after a predetermined number of mold closings. In the example shown in FIG. 7, the reference value is not corrected each time and the amount of positional displacement gradually increases in the second and third mold closings. Up to the fourth mold closing, the amount of positional displacement is within a range in which the mold can be closed and thus, the reference value of the displacement sensor 20 can be corrected by closing the mold in an approximately correct position. The position after the fifth mold closing has too large a positional displacement to close the mold and thus, it is desirable to correct the reference value before the amount of positional displacement becomes too large.

When the mold rotating device is positioned in at least two phases of 0 degree and 180 degrees, the number of the displacement sensors 20 can be reduced to one by arranging the detected portion 22 in each phase (see FIG. 3). However, the actual position of the mold rotating device to be positioned may deviate from the distance detected by the displacement sensor 20 due to individual differences of the detected portion 22 and mounting errors. Thus, an adjustment amount in each phase is grasped in advance and an output signal from the displacement sensor 20 is adjusted in each phase.

These adjustments are adjustments to deal with a case in which a detection value of the displacement sensor 20 does not match 0 degree or 180 degrees due to individual differences or mounting errors of the detected portion 22 when the rotary table is positioned in a designed position of 0 degree or 180 degrees and are mainly made when the rotary table 10 is assembled or the displacement sensor 20 is replaced.

Even if adjustments are made as described above, when a mold is actually mounted on the rotary table 10, the rotary table 10 is rotated, and the mold is closed, a slight displacement may still arise due to a difference of the mounting position of the mold on the rotary table 10, a difference of a fitting state of a guide pin or the like if the mold. In such a case, the method described above may be used to make reference corrections such that a detected distance of the displacement sensor 20 in a mold closed state becomes a predetermined distance.

Figure 8A:
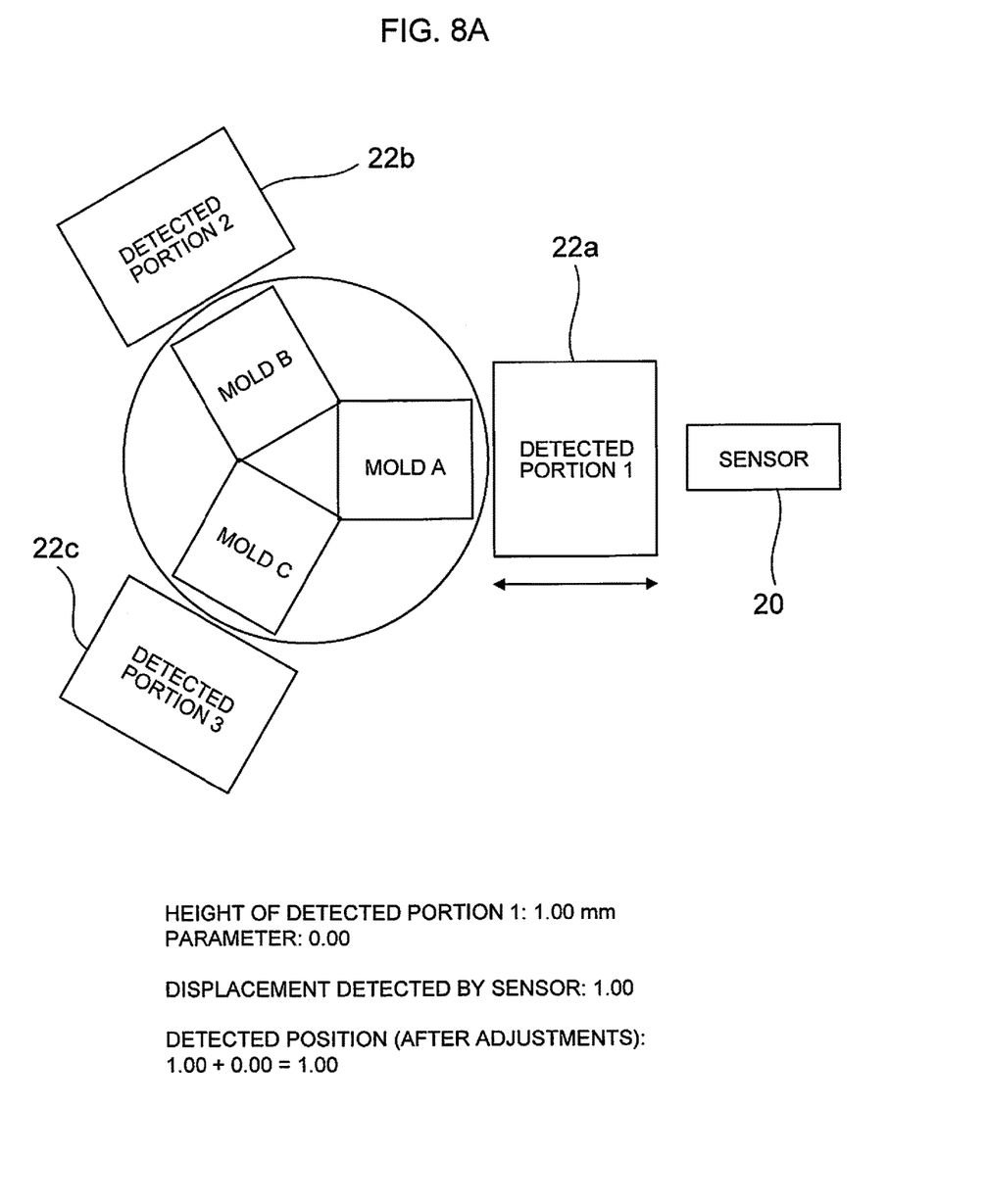
FIG. 8A is a diagram illustrating still another embodiment of the present invention.
Figure 8B:
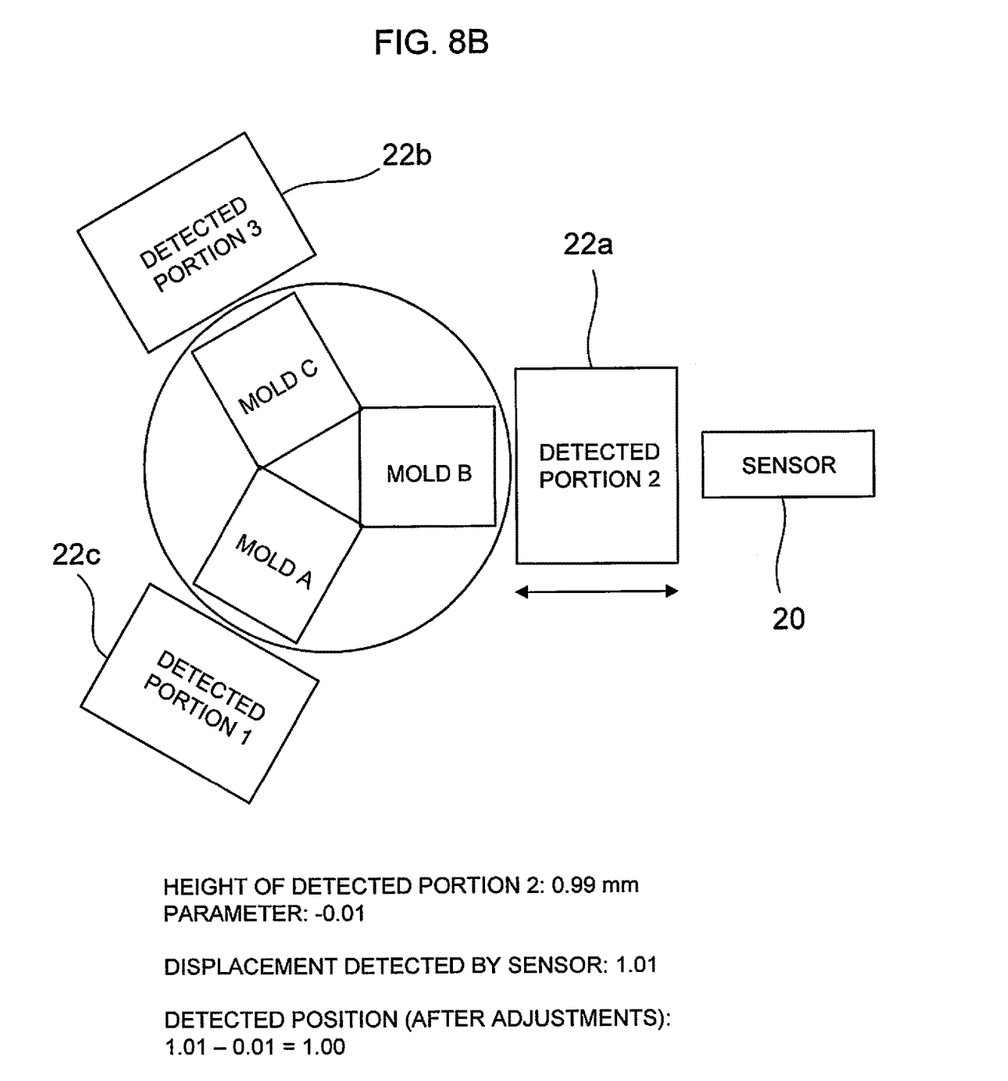
FIG. 8B is a diagram illustrating still another embodiment of the present invention.
Figure 8C:
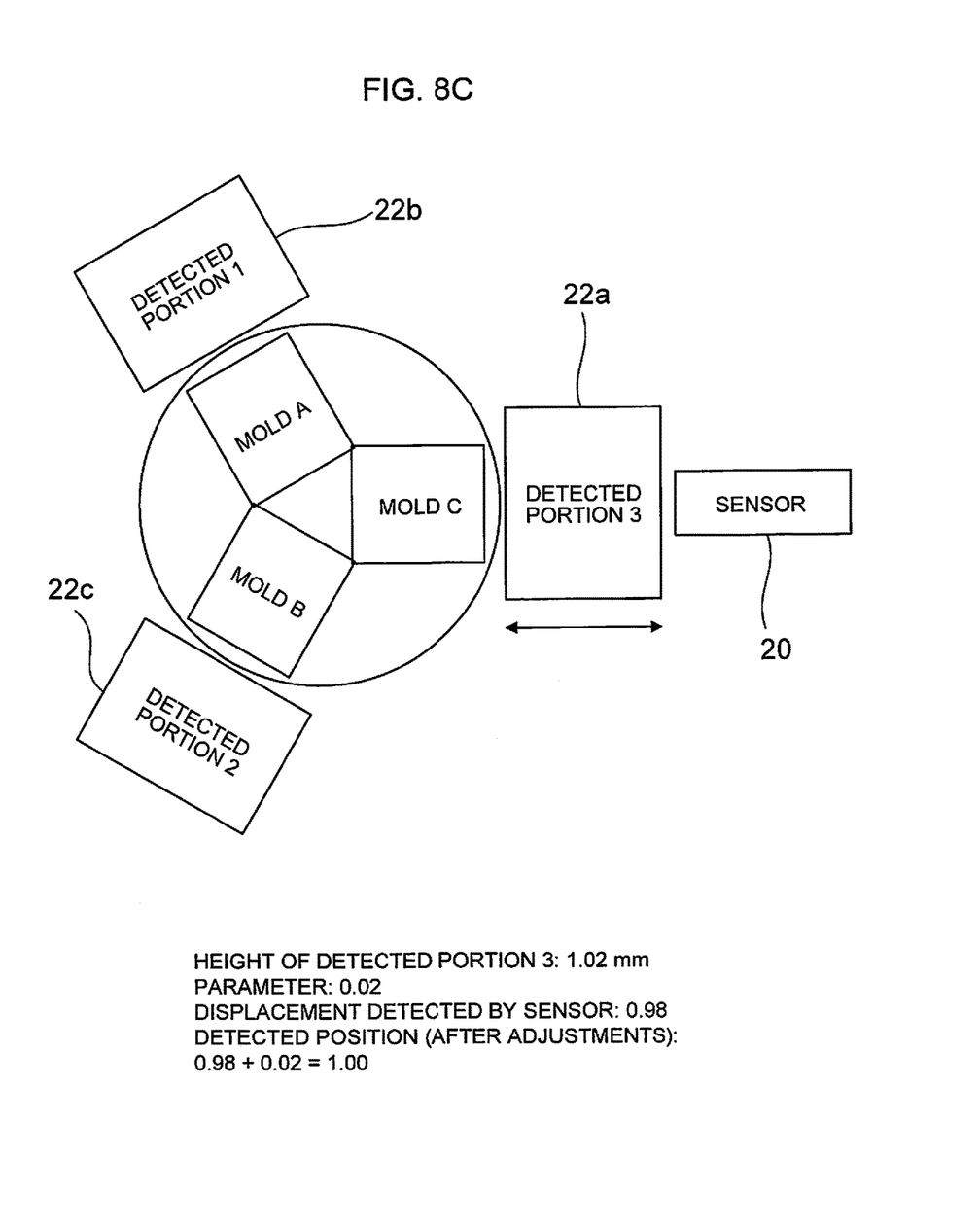
FIG. 8C is a diagram illustrating still another embodiment of the present invention.

FIGS. 8A to 8C are diagrams illustrating adjustments in the present embodiment. In FIGS. 8A to 8C, examples in which the number of the displacement sensors 20 provided is one and the number of the detected portions 22 provided is three are shown. FIG. 8A is an example in which a first detected portion 22a of the three detected portions 22 is close to the displacement sensor 20, FIG. 8B is an example in which a second detected portion 22b is close to the displacement sensor 20, and FIG. 8C is an example in which a third detected portion 22c is close to the displacement sensor 20.

Here, as shown in FIGS. 8A to 8C, the first detected portion 22a, the second detected portion 22b, and the third detected portion 22c are different in height of the detected portions 22. Accordingly, the values of displacement detected by the displacement sensor 20 are different in accordance with differences of height of the respective detected portions 22. The differences are provided as parameters and adjustments are made such that the values of displacements detected by the displacement sensor 20 are the same by adding the values of the parameters.

Figure 9A:
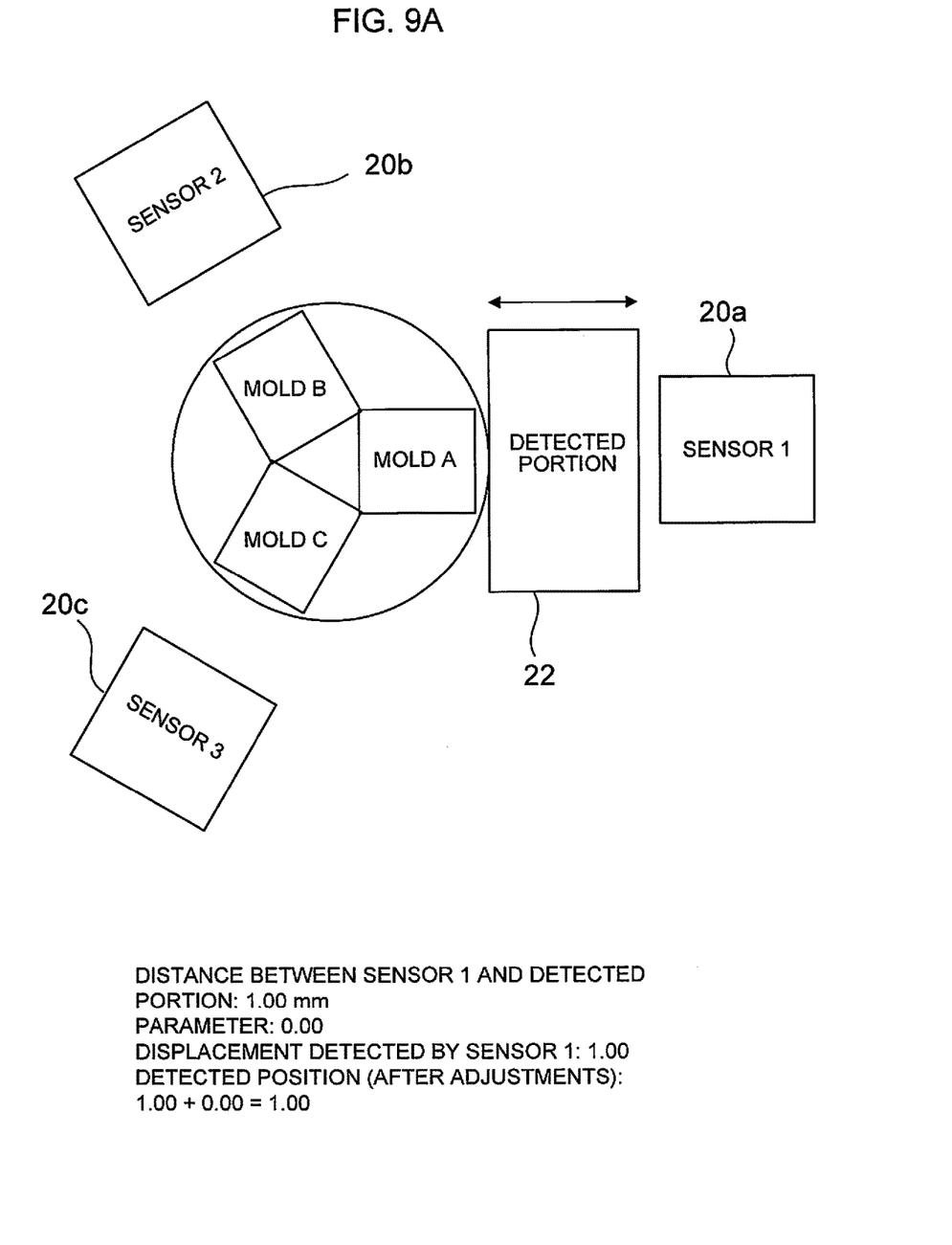
FIG. 9A is a diagram illustrating still another embodiment of the present invention.
Figure 9B:
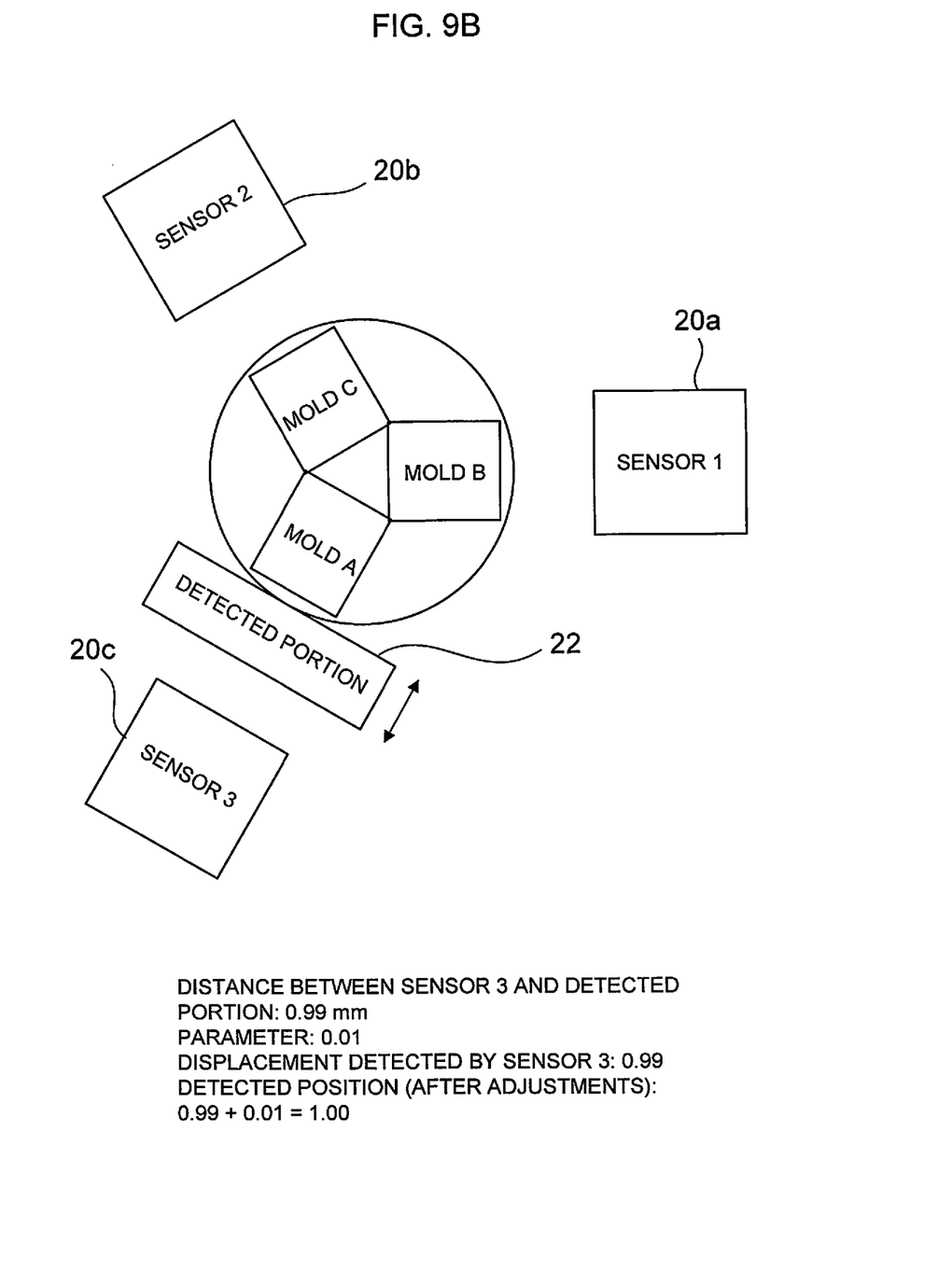
FIG. 9B is a diagram illustrating still another embodiment of the present invention.
Figure 9C:
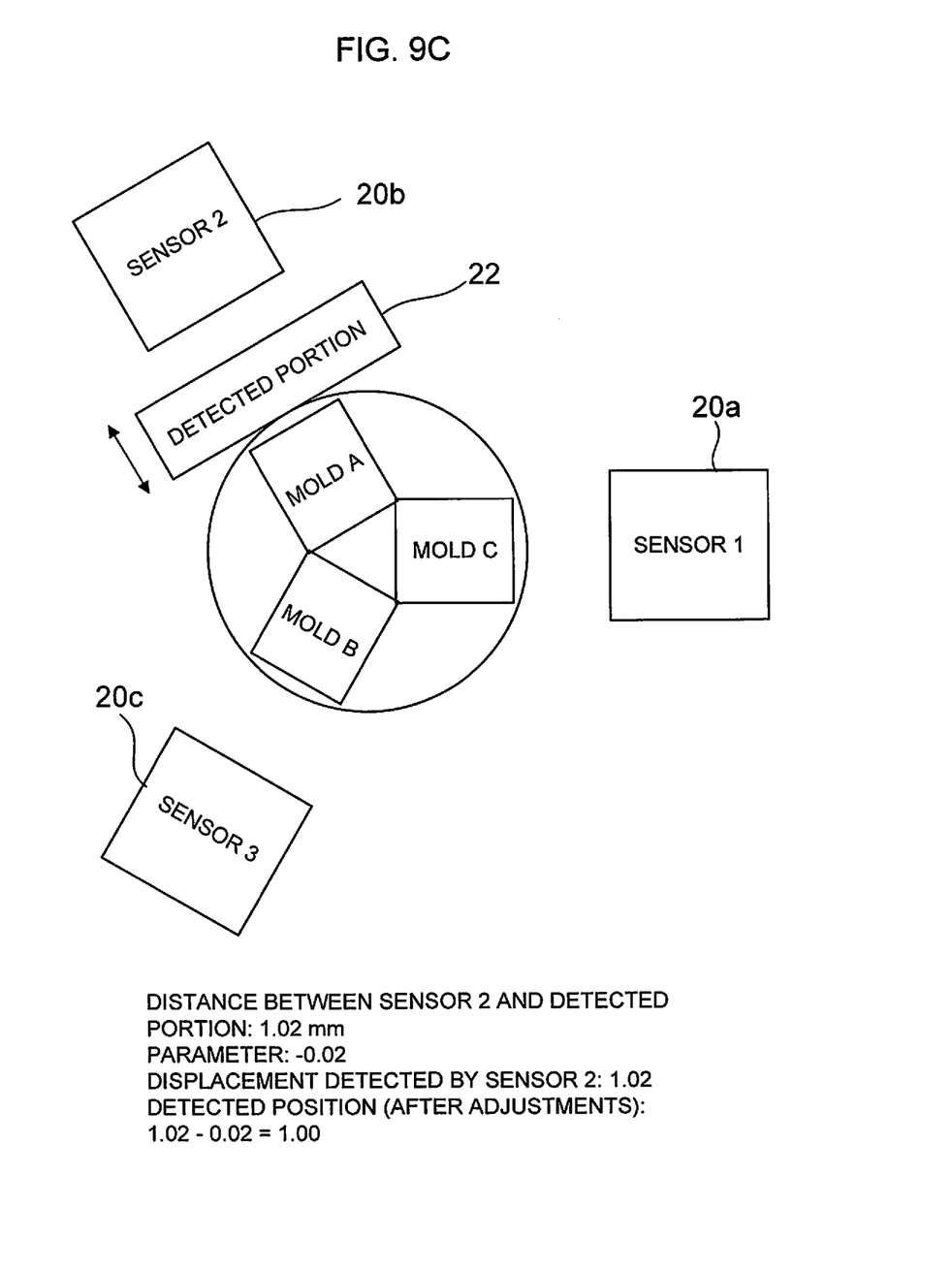
FIG. 9C is a diagram illustrating still another embodiment of the present invention.

FIGS. 9A to 9C are modifications of the examples of FIGS. 8A to 8C. In FIGS. 9A to 9C, examples in which the number of the detected portions 22 provided is one and the number of the displacement sensors 20, detecting the detected portions 22, provided is three are shown. FIGS. 9A is an example in which a first displacement sensor 20a of the three displacement sensors 20 is close to the detected portion 22, FIG. 9B is an example in which a second displacement sensor 20b is close to the detected portion 22, and FIG. 9C is an example in which a third displacement sensor 20c is close to the detected portion 22.

In the examples of FIGS. 9A to 9C, like the examples of FIGS. 8A to 8C, the distance between the displacement sensor 20 and the detected portion 22 is different from the displacement sensor 20 to the displacement sensor 20. Accordingly, the value of displacement detected is also different from the displacement sensor 20 to the displacement sensor 20 and the differences are provided as parameters and adjustments are made such that the values of displacement detected by the respective displacement sensors 20 are the same by adding the values of the parameters.

If a mold rotating device and a control device have no malfunction, when rotated to a predetermined position under the rotation control by a first rotation controller including a rotation detection device provided in a motor, the detected portion 22 falls within a distance detection range of the displacement sensor 20. Then, a signal in accordance with the detected distance is input into the control device and at this point, the rotation control as the next process can transfer to a second rotation controller including the displacement sensor 20 and the detected portion 22. If a malfunction such as a tooth jump of a timing belt, slipping of a power transmission mechanism, or a displacement sensor being unable to detect the position correctly occurs, a case in which the mold does not rotate correctly even if the motor rotates a predetermined rotation amount can be assumed. Thus, if the distance between the displacement sensor 20 and the detected portion 22 deviates from a preset range when switched from the rotation control by the first rotation controller to the rotation control by the second rotation controller, the state is determined as an abnormal state and the operator is notified of the abnormal state to let the operator stop the operation.

Figure 10:
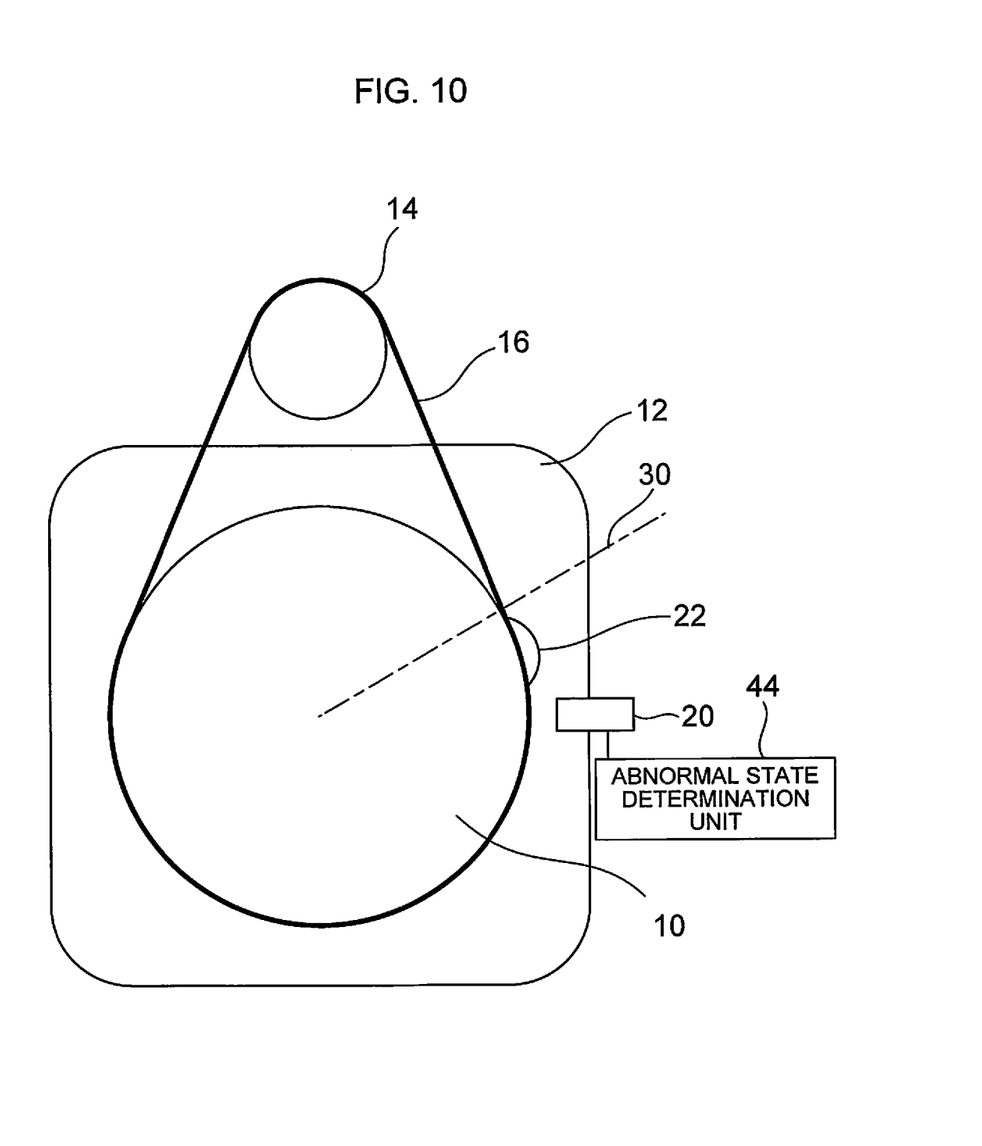
FIG. 10 is a diagram illustrating still another embodiment of the present invention.

FIG. 10 is a diagram illustrating the present embodiment. FIG. 10 shows a state when the rotation control by the first rotation controller including the rotation detection device provided in the motor transfers to the rotation control by the second rotation controller including the displacement sensor 20 and the detected portion 22. Here, reference sign 30 is a virtual line indicating a predetermined range set in advance of the distance between the displacement sensor 20 and the detected portion 22. In the example shown in FIG. 10, when the rotation control by the first rotation controller transfers to the rotation control by the second rotation controller including the displacement sensor 20 and the detected portion 22, the distance between the displacement sensor 20 and the detected portion 22 is within the predetermined range set in advance and so the state is determined to be a normally operating state. If the distance between the displacement sensor 20 and the detected portion 22 is outside the predetermined range set in advance when the rotation control by the first rotation controller transfers to the rotation control by the second rotation controller including the displacement sensor 20 and the detected portion 22, an abnormal state determination unit 44 determines that some abnormal state has occurred and notifies the operator of the abnormal state to let the operator stop the operation.

The invention claimed is:

1. An injection molding machine, comprising:
a motor having a rotation amount detection unit;
a mold rotating device driven by the motor and having a rotary table on which a mold is to be mounted;
a detected portion provided in the rotary table;
a distance detection unit configured to detect a distance to the detected portion;
a first rotation controller configured to perform rotation control of the rotary table by feedback control based on a rotation amount detected by the rotation amount detection unit;
a second rotation controller configured to perform rotation control of the rotary table by the feedback control based on the distance detected by the distance detection unit;
a control device configured to, at a predetermined rotation angle of the rotary table between a rotation start and a rotation end of the rotary table, switch from the rotation control by the first rotation controller to the rotation control by the second rotation controller; and
a reference correction unit configured to make reference corrections of distance detection by the distance detection unit based on a positional relationship of the mold when the mold is closed.

2. The injection molding machine according to claim 1, wherein
the mold rotating device is configured to perform positioning of the rotary table in at least two different phases of the rotary table, and
the mold rotating device includes an adjustment unit configured to adjust the distance detected by the distance detection unit in each of the phases of the positioning.

3. The injection molding machine according to claim 1, wherein when the distance detected by the distance detection unit during switching from the rotation control by the first rotation controller to the rotation control by the second rotation controller deviates from a preset range, the mold rotating device is determined to be abnormal.

* * * * *